US007739218B2

(12) United States Patent
Argüello et al.

(10) Patent No.: US 7,739,218 B2
(45) Date of Patent: Jun. 15, 2010

(54) SYSTEMS AND METHODS FOR BUILDING AND IMPLEMENTING ONTOLOGY-BASED INFORMATION RESOURCES

(75) Inventors: Juan Fernando Argüello, Belmont, CA (US); Youssef Drissi, Ossining, NY (US); Nicholas C. M. Fuller, Ossining, NY (US); Ijeoma M. Nnebe, Elmsford, NY (US); Daby M. Sow, North White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 11/204,726

(22) Filed: Aug. 16, 2005

(65) Prior Publication Data
US 2007/0043742 A1    Feb. 22, 2007

(51) Int. Cl.
G06F 15/18    (2006.01)
G06F 17/00    (2006.01)
(52) U.S. Cl. .............................. 706/61; 707/2; 704/207
(58) Field of Classification Search ..................... 707/2, 707/10; 704/503, 207, 208; 708/313; 706/20, 706/12, 25, 61
See application file for complete search history.

(56) References Cited

U.S. PATENT DOCUMENTS

| 5,913,061 A * | 6/1999 | Gupta et al. ................ 719/310 |
| 6,101,515 A * | 8/2000 | Wical et al. ................. 715/531 |
| 6,158,044 A * | 12/2000 | Tibbetts ...................... 717/100 |
| 2004/0220905 A1* | 11/2004 | Chen et al. ..................... 707/3 |

OTHER PUBLICATIONS

Paul Baitelaar, et al., "Ontology Learning from Text: An Overview", pp. 1-10, Book Title, Book Editors, IOS Press, 2003.

* cited by examiner

*Primary Examiner*—Donald Sparks
*Assistant Examiner*—Kalpana Bharadwaj (57) ABSTRACT

Systems and methods are provided for building and implementing ontology-based information resources. More specifically, multi-user collaborative, semi-automatic systems and methods are provided for constructing ontology-based information resources that are shared by a community of users, wherein ontology categories evolve over time based on categorization rules that are specified by the community of users as well as categorization rules that are automatically learned from knowledge obtained as a result of multi-user interactions and categorization decisions.

23 Claims, 6 Drawing Sheets

SYSTEMS AND METHODS FOR BUILDING AND IMPLEMENTING ONTOLOGY-BASED INFORMATION RESOURCES

TECHNICAL FIELD OF THE INVENTION

The invention relates generally to systems and methods for building and implementing ontology-based information resources. More specifically, the invention relates to multi-user collaborative, semi-automatic systems and methods for constructing ontology-based information resources that are shared by a community of users, wherein ontology categories evolve over time based on categorization rules that are specified by the community of users as well as categorization rules that are automatically learned from knowledge obtained as a result of multi-user interactions and categorization decisions.

BACKGROUND

Due to continuing technological innovations in computer processing and networking, and the development of higher density memory devices, the amount of electronic information being stored in electronic repositories is continuing to grow at exponential rates. Indeed, by way of example, there is a vast amount of electronic information which is stored in millions of publicly accessible electronic libraries and other data sources on the World Wide Web, for example.

Although such electronically accessible information provides a vast source of information from which desired knowledge can be extracted, it is important to implement methods that enable an individual to efficiently locate desired information and extract relevant knowledge of user interest. Conventional methods that use "keyword" searching can be inefficient and inaccurate for various reasons such as variation in terminology, etc. Moreover, it is important to effectively manage the knowledge acquired from such electronic information. For instance, as a user continues to build a local electronic library of electronic information acquired from the Web, for instance, it would be highly desirable to utilize a management system that could efficiently organize and classify information in the local electronic library to thereby facilitate identification and access of relevant information from the repository.

SUMMARY OF THE INVENTION

Exemplary embodiments of the invention generally include systems and methods for building and implementing ontology-based information resources. More specifically, exemplary embodiments of the invention include multi-user collaborative, semi-automatic systems and methods for constructing ontology-based information resources that are shared by a community of users, wherein ontology categories evolve over time based on categorization rules that are specified by the community of users as well as categorization rules that are automatically learned from knowledge obtained as a result of multi-user interactions and categorization decisions.

In one exemplary embodiment of the invention, an information sharing system is provided, which includes an information management system that provides user assistance for interacting with the system, a shared information repository having electronic files that are categorized according to an ontology, a repository of categorization rules which are used by the information management system for automatically categorizing an electronic file to be stored in the shared information repository, and a learning engine that automatically generates or updates categorization rules in the repository of categorization rules based on knowledge obtained from multi-user interactions with the system.

The information management system provides user assistance in storing electronic files in the shared information repository. The electronic files can be, for instance, PDF files, word processing files, presentation files, image files, movie files, etc. The electronic files can be stored under one or more user-specified-ontological categories, or ontological categories that are automatically determined and suggested by the information management system. In another exemplary embodiment, the information management system allows one or more sections of an electronic file to be independently categorized for storage in the shared information repository.

In another exemplary embodiment of the invention, the information management system monitors user interactions with an external information source and automatically prompts a user with an option to store an electronic file in the shared information repository when the user accesses the electronic file from the external information source.

In yet another exemplary embodiment of the invention, the information management system records a history of the user-interactions over a period of time, wherein the user interactions comprise user search patterns. The system further includes a repository of search histories which stores search history data that is automatically derived by processing the recorded history of user interactions. For example, the system will record and store the search histories of one or more users over a period of time and then consolidate the most common searches into the search history repository. In another embodiment of the invention, the search history data can then be accessed and utilized to formulate more focused and efficient searches.

In another exemplary embodiment of the invention, the information management system processes the search history data to determine preferred subjects of interest information for one or more users, and then stores the preferred subjects of interest information in a user interest index.

In yet another exemplary embodiment of the invention, the system comprises a publish and subscribe agent system that uses the preferred subjects of interest information in the user interest index to automatically track and identify newly published electronic files in one or more external information sources, which correspond to the preferred subjects of interest information of one or more users. The system will automatically notify one or more users of newly published electronic files. In another exemplary embodiment, the information management system automatically stores the newly published electronic files in the shared information repository.

These and other exemplary embodiments, features and advantages of the present invention will be described or become apparent from the following detailed description of exemplary embodiments, which is to be read in connection with the accompanying drawings.

DETAILED DESCRIPTION OF EXEMPLARY EMBODIMENTS

Exemplary systems and methods for building and implementing ontology-based information resources that are shared by a community of users will now be discussed in greater detail with reference to the exemplary Figures in which the same reference numerals denote the same or similar elements. It is to be understood that the systems and methods described herein in accordance with the present invention may be implemented in various forms of hardware, software, firmware, special purpose processors, or a combination thereof. In particular, in one exemplary embodiment, systems and methods of the invention are implemented in software comprising program instructions that are tangibly embodied on one or more program storage devices (e.g., hard disk, magnetic floppy disk, RAM, CD ROM, DVD, ROM and flash memory), and executable by any device or machine comprising suitable architecture.

It is to be further understood that because the system modules and method steps depicted in the accompanying Figures can be implemented in software, the actual connections between the system components (or the flow of the process steps) may differ depending upon the manner in which the application is programmed. Given the teachings herein, one of ordinary skill in the related art will be able to contemplate these and similar implementations or configurations of the present invention.

Figure 1:
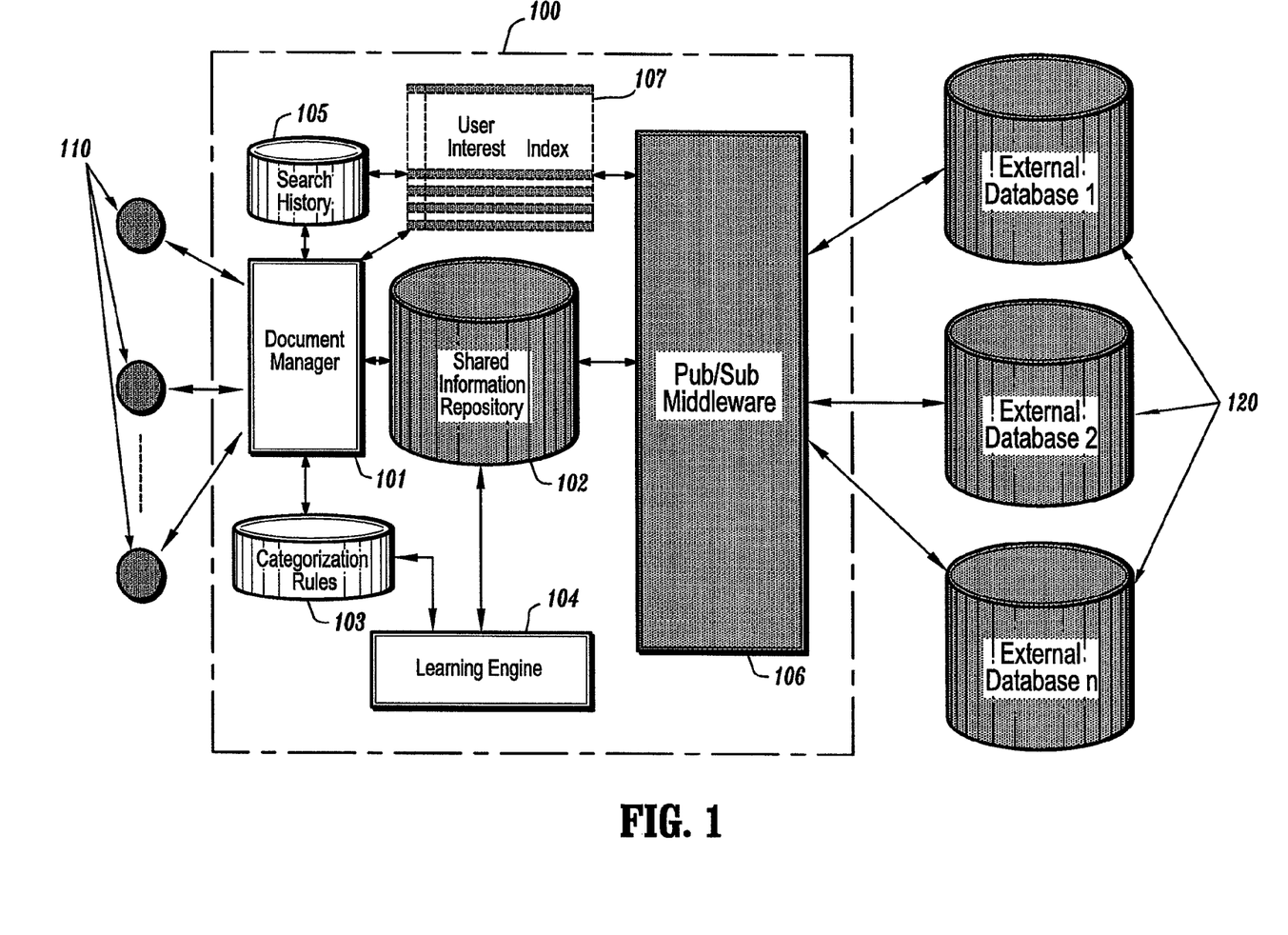
FIG. 1 illustrates a system for building and implementing an ontology-based information resource according to an exemplary embodiment of the invention.

FIG. 1 illustrates a system for building and implementing an ontology-based information resource according to an exemplary embodiment of the invention. More specifically, FIG. 1 illustrates a multi-user collaborative system (100) that enables a community of users (110) to construct and populate an ontology-based shared information resource (102) with electronic information (e.g., electronic files, documents, etc.) relevant to one or more domains of interest, which is accessed from one or more external data sources (120). In general, the system (100) implements semi-automatic functions to provide user assistance for classifying and managing electronic information using an ontological model that is incrementally built/adapted over time based on usage of the system (100) by the community of users (110), which takes into consideration that the meanings and relationships between ontological classes/categories can evolve over time. More specifically, as will be explained in further detail below, the system (100) supports collaborative semi-automatic methods for constructing ontologies having user-specified ontological classes as well as ontological classes that are automatically learned based on knowledge obtained from user categorization decisions and other user interactions/usage with/of the system (100). In addition, the system (100) implements functions that are supported by the shared information resource ontology to provide domain-focused searching and retrieval of electronic information for one or more domains of interest.

In the exemplary embodiment of FIG. 1, the system (100) comprises a document manager module (101) (or information management system), a shared information repository (102) (or local database), a repository of categorization rules (103), a learning engine (104), a repository of user search histories (105), a publish/subscribe module (106) and a user interest index (107). In general, the document manager module (101) is a user agent that allows the end-users (110) to interact with the system (100). The document manager module (101) processes user queries to assist users with categorizing and storing electronic information (e.g., electronic documents) in the shared information repository (102). Methods for categorizing and storing electronic information according to exemplary embodiments of the invention will be discussed below with reference to FIGS. 2, 3, and 5 for example.

In another exemplary embodiment, the document manager module (101) also provides user assistance for searching and accessing electronic information in the shared information repository (102) and/or one or more external data sources (120). Methods for providing domain-focused searching and rapid access of user desired electronic files will be discussed with reference to the exemplary embodiments of FIGS. 4, 5 and 6, for example.

The shared information repository (102) is essentially a knowledge base of information for one or more domains of interest which is shared by the community of users (110). More specifically, the shared information repository (102) is used for storing and managing shared knowledge for plurality of end-users using a structured representation of electronic information according to one or more ontological models. In accordance with an exemplary embodiment of the invention, an ontology comprises an ontological model/structure in which various ontological classes (interest domains, categories, etc) are specified/defined and arranged in a taxonomic hierarchy, and populated with electronic files having content that is relevant to one or more ontological domains/categories.

Figure 2:
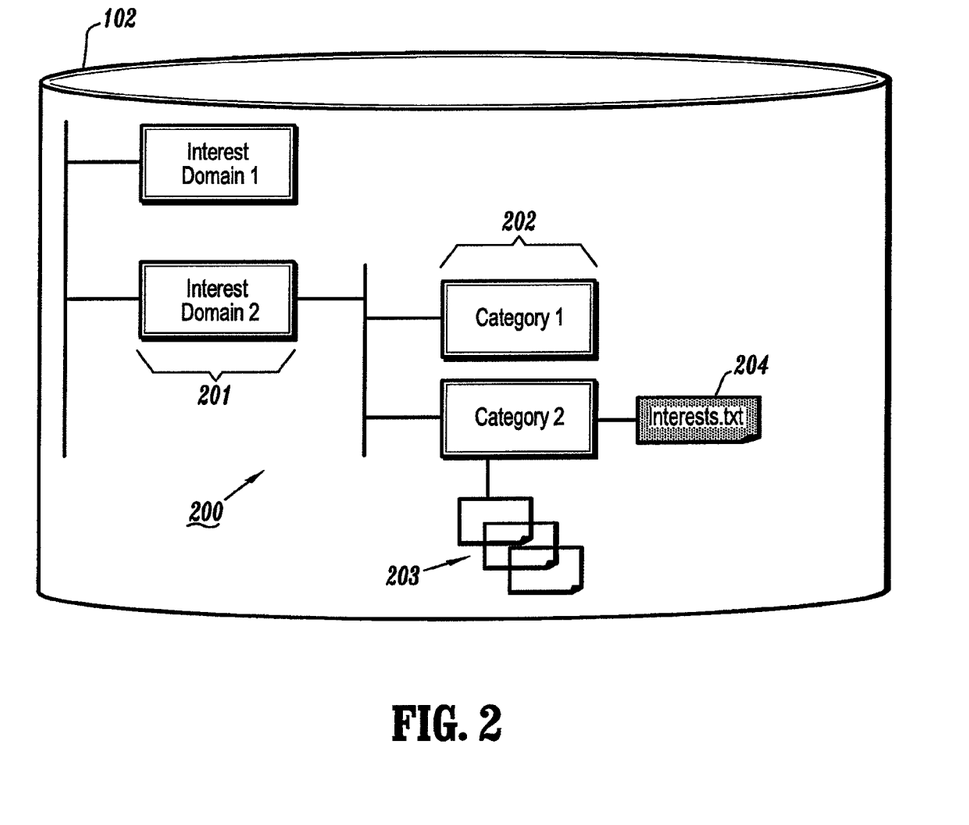
FIG. 2 illustrates an ontological representation of a shared information resource according to an exemplary embodiment of the invention.

It is to be appreciated that the ontological classes can be represented in the shared document repository (102) using various techniques. For instance, FIG. 2 illustrates an ontological representation (200) for the shared information resource (102) according to an exemplary embodiment of the invention. In particular, the exemplary ontology (200) implements a multi-level tree categorization approach, wherein a first level of the model (200) corresponds to one or more domains of interest (201) ("interest domains") (e.g., Information Theory, Game Theory), and wherein a second level of the model (200) defines one or more categories (202) within corresponding interest domains (201) (e.g., source coding theorem under Information Theory, Nash equilibrium under Game Theory, etc.). In other exemplary embodiments, the categories (202) can be further refined by sub-categories, and so on, depending on the desired granularity of information.

The leaves of the tree (categories (202), sub-categories, etc.) contain electronic files (203) that are classified under one or more categories (202), within one or more interest domains (201). The electronic files can be, e.g., PDF files, word processing files, presentation files, image files, movie files, etc, having content relevant to one or more domains/categories of the ontology (200). The electronic files are tagged with classification tags to indicate the classes to which the files are assigned and stored in the shared information repository.

It is to be appreciated that the ontological classes (201, 202) of the ontology (200) will evolve and dynamically adapt over time based on user-specified classes and/or classes that are automatically learned. For example, the ontology (200) will evolve over time as new classes are added, old classes are removed, individual classes are combined and renamed, or as the granularity of the ontological model is otherwise refined as new ontological concepts are automatically learned or specified by the end users, etc.

In another embodiment of the invention, electronic files (203) can be stored in association with additional metadata (204) associated with a user's specific and perhaps unique interest in an electronic file (referred to as "unique preferred interest (UPI)") that is added to the general classification tags. The UPIs are not shared across users but are used to facilitate user searches for documents in the shared repository (102) based on the individual user's interest.

Referring back to FIG. 1, the repository of categorization rules (103) comprises categorization rules which are used by the document manager module (101) to assist end users for categorizing electronic files that are to be stored in the shared information repository (102). The document manager (101) uses the categorization rules (103) to automatically process and assign one or more ontological classes to an electronic file that is to be stored in the shared information repository (102). The categorization rules (103) may include user-specified rules and/or machine-learned rules that are learned from historical logs of multi-user interactions with the system (100).

In particular, by way of example, the learning engine (104) implements methods for mining the shared information repository (102) to extract information that can be used to train new classification/categorization models/rules that are stored in the categorization rules repository (103), or otherwise dynamically update previously trained classification/categorization models/rules that are implemented by the document manager (101) to assist in categorizing and storing electronic files in the shared information repository (102). In one exemplary embodiment of the invention, the learning engine (104) implements methods known to those of ordinary skill in the art for mining the shared information repository (102) to extract categorization patterns based on historical patterns of user-specified classification of stored electronic files, or otherwise extract information from stored electronic files which is used to refine existing, or otherwise discover new, ontological classes.

It is to be appreciated that the use of machine learning techniques to generate/update the categorization rules (103) enables an ontology to be incrementally constructed and developed over time to thereby improve and optimize classification of relevant electronic information. In one exemplary embodiment of the invention, the categorization rules (103) can be generated/updated using a batch approach, whereby the learning engine (104) periodically mines the entire repository (102) and generates new categorization rules or updates existing categorization rules that are stored in the categorization rules repository (103). In another exemplary embodiment of the invention, an incremental approach is employed, whereby the learning engine (104) is invoked each time a new electronic file is added to the shared information repository (102). Again, with this approach, the learning engine (104) can either add a new rule in the categorization rules repository (103) or update statistics of existing rules in the repository (103).

The repository of search histories (105) comprises compounded search history data derived from one or more user search patterns over a period of time. More specifically, in one exemplary embodiment of the invention, the document manager module (101) includes methods for monitoring, logging and compiling search histories of one or more end users over a period of time, wherein the most common searches are consolidated into the search history repository (105). As will explained below with reference to FIG. 4, for example, the compounded search history data can be accessed by end users to formulate efficient document search queries.

The user interest index (107) is generated by the document manager (101) based on search history information stored in the search history repository (105). In particular, the document manager (101) will periodically analyze search history data in the search history database (105) to determine one or more preferred subjects of user interest for one or more end-users based on keyword/phrases and subject areas that most frequently appear in electronic files accessed by the users from one or more external data sources (120). The document manager (101) will then generate/update the user interest index (107) for a given user, which identifies specific types of documents that correspond to the preferred subjects of interest as determined for the given user. The information stored in the user interest index (107) can be used by the learning engine (104) to update the ontological model of the shared information repository (102) and the categorization rules in the categorization rules repository (103).

The publish/subscribe middleware module (106) implements methods for automatically subscribing to one or more of the external data sources (120) to track currently published electronic information corresponding to subject areas of user interest and automatically notifying end-users of such current information. In particular, the publish/subscribe module (106) includes methods for processing the user interest index (107) to identify specific topics of user interest and registers triggers with the external data sources (120) to identify electronic files with specific topics of user interest. Whenever new electronic information (e.g., electronic document) is published in a given channel, the publish/subscribe module (106) notifies the end users who are registered to the given channel of such newly published information the option to store the new document in the shared repository (102). This functionality provides automated user subscription to information channels of interest to enable the end-users (110) to be automatically apprised of current references/documents in preferred subject areas of interest.

It is to be appreciated that the collaborative system (100) of FIG. 1 may be implemented in various computing environments. For example, the system (100) may be implemented as a stand alone application that executes on a personal computer platform, which is utilized by a community of users. In another exemplary embodiment of the invention, for example, the system (100) may be implemented in a client/server network environment, whereby the system (100) executes via an application server or web server, which is remotely accessible by the community of users (110) over a network (e.g., extranet, intranet, Internet) via client access devices (e.g., personal computer executing a GUI browser, for example.). The system (100) modules may be distributed over different nodes of the network.

Moreover, in another exemplary embodiment of the invention, the system (100) may be accessed by end user to process, classify and store previously accessed electronic files. In another embodiment, the system (100) may operate as a proxy on behalf of the end-users through which the end users can browse/navigate for electronic information in the external data sources (120). In other exemplary embodiments, the system (100) may be a service that is operated by a third-party service provider to whom service fees are paid by the community of end users according to one or more business models.

Figure 3:
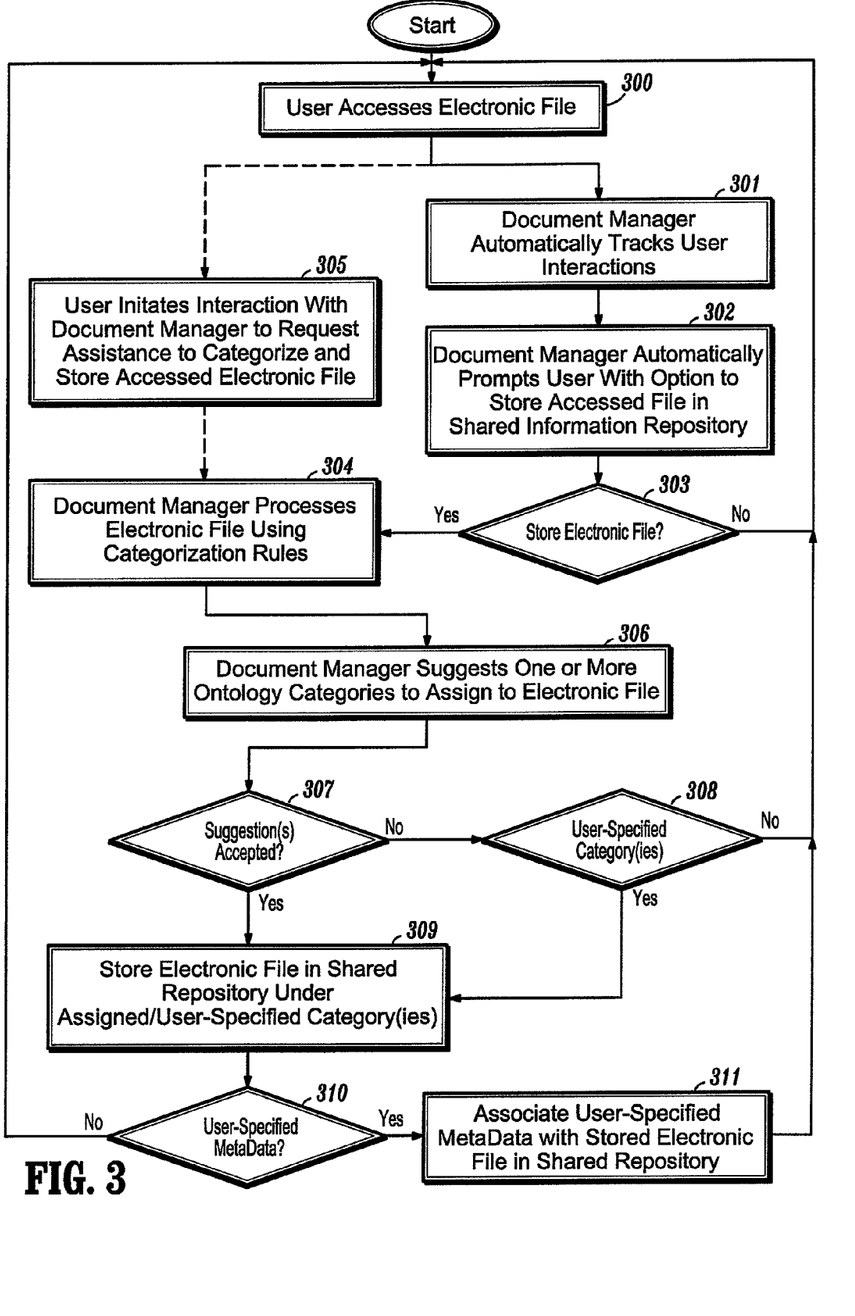
FIG. 3 illustrates methods for categorizing electronic information for populating an ontology according to exemplary embodiments of the invention.

FIG. 3 illustrates methods for categorizing electronic information for populating an ontology according to exemplary embodiments of the invention. More specifically, by way of example, FIG. 3 depicts methods that are implemented by the document manager (101) for supporting and providing user-assistance for classifying electronic information. In this regard, the exemplary methods of FIG. 3 will be discussed with further reference to the system (100) of FIG. 1. Referring to FIG. 3, in one exemplary embodiment of the invention wherein the system (100) operates as a background proxy, while a user browses (step 300) for information in one or more of the remote external data sources (120) (e.g., Google, SciFinder, Web of Knowledge, IEEE, etc.), the document manager (101) will automatically monitor user interactions (e.g., document search and retrieval) (step 301).

The system (100) will be "flagged" via the document manager (101) when the user accesses (opens, downloads, etc.) an electronic file of any type (e.g., PDF file) from an external data source, and the document manager (101) will automatically prompt the user with an option to store the accessed electronic file in the shared document repository (102) (step 302). In such instance, the user will choose an option to store the file (affirmative result in step 303) or to not store the file (negative result in step 303). In another exemplary embodiment of the invention, wherein the system (100) does not operate as a background proxy, the user can initiate interaction with the document manager (101) to request assistance to categorize and store an electronic file that was previously accessed by the user (step 305).

In either circumstance—where the user requests assistance (step 305) or elects assistance upon automated prompting by the document manager (affirmative result in step 303)—the document manager (101) will automatically process the electronic file using the relevant categorization rules to determine one or more potential categories of the ontological model for storing the electronic file (step 304). The document manager (101) will then prompt the user with an option of storing the electronic file according to one or more suggested classifications (step 307) or according to a user-specified classification (step 308). In either instance, a full version of the electronic file will be stored in the shared repository according to the user-specified classification and/or the system-suggested classification (step 309).

In one exemplary embodiment of the invention, the electronic file is stored in association with one or more pre-defined information tags having information that is extracted during processing of the electronic file. For example, with electronic documents, the predefined tags may include information extracted from the document including the document Title, the name of the Author(s), the Author contact information (e.g., e-mail), as well as one or more relevant keywords contained in the document (which can be automatically determined using known document processing methods or extracted from a pre-specified section of the document that includes a list of relevant keyword identified by the author(s)). The pre-defined tags can be used for fast and efficient searching and accessing of electronic files stored in the shared-information repository. It is to be understood that the amount and type of information tags that are implemented will vary depending on the type of electronic files being stored and the type of information that can be automatically extracted from a given electronic file. The information associated with the pre-defined information tags can be shared among the community of users and can be used by the learning engine to obtain knowledge used for incrementally constructing the ontology.

In addition, the document manager (101) allows the user to specify unique metadata that is stored in association with the electronic file (step 310). The unique metadata corresponds to a user's specific and perhaps unique interest in the electronic file (referred to as a unique preferred interest (UPI)) and can be specified using a UPI tag stored in association with the electronic file in the shared repository. The metadata contained within UPI tags as defined by a given user, can be utilized to formulate search queries to enable a user to quickly search and access relevant electronic files in the shared information repository having corresponding UPI tags. The information contained within UPI tags is not shared among the community of users and is not used for incrementally constructing the ontology.

Figure 4:
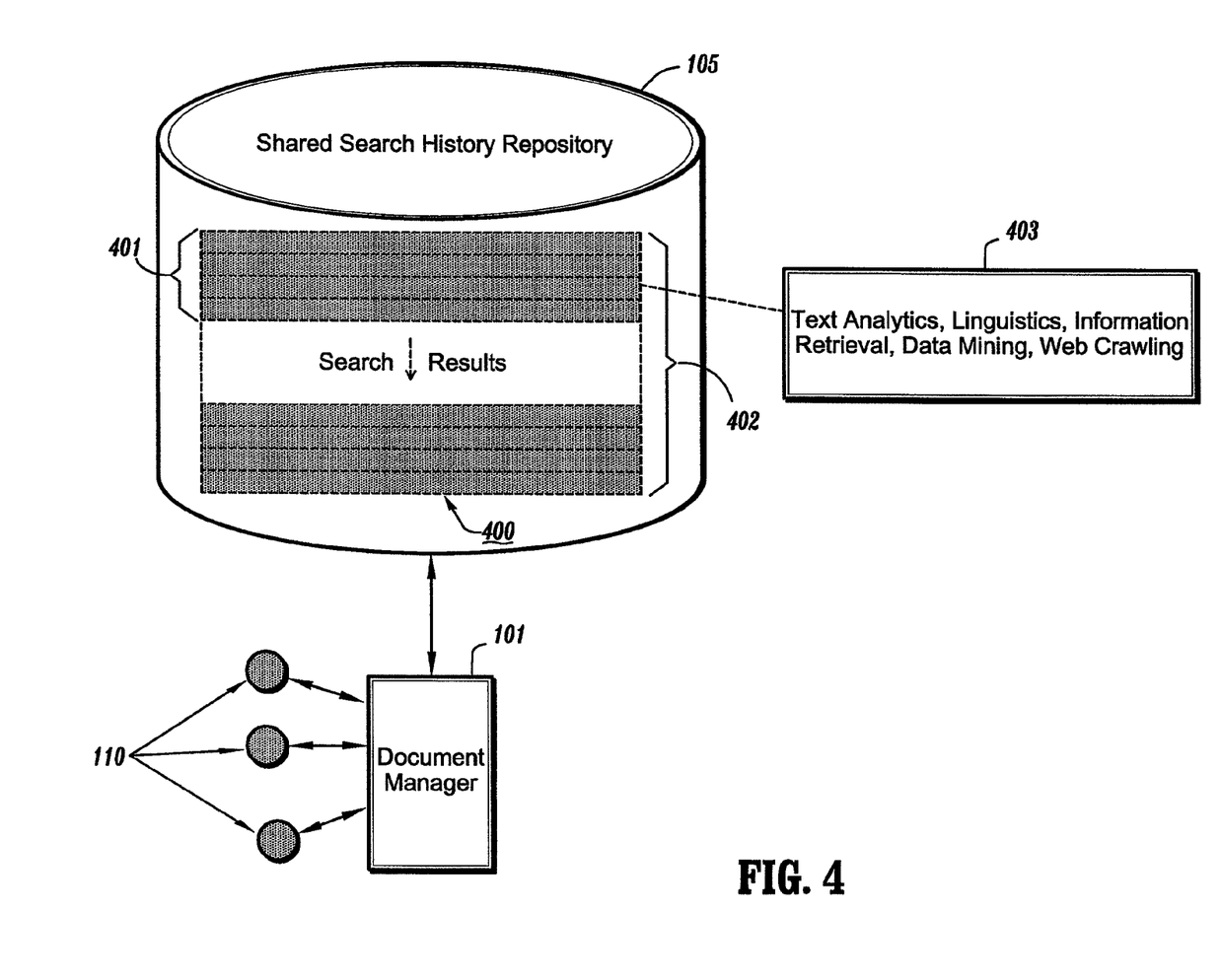
FIG. 4 illustrates a method for multi-user collaborative searching and accessing of electronic information using shared search history information according to an exemplary embodiment of the invention.

As noted above with reference to FIG. 1, the system (100) can automatically monitor and record search patterns and categorization patterns of the end-users. For example, as users within the community of users (101) execute different searches over time, the system (100) will track and consolidate the most common searches into the search history repository (105). By recording the search activity of the user community, the search history (105) can be viewed and leveraged by individual users to improve on the efficiency of their search. By way of example, FIG. 4 illustrates a method for multi-user collaborative searching and accessing of electronic information using shared search history information, according to an exemplary embodiment of the invention. FIG. 4 illustrates a method that enables a user to access search history data (400) within the shared search history repository (105). In particular, when one or more end users (110) wish to search for electronic files using the search history data (400), the users submit requests to the document manager (101) and specify a time span from which a set of search results (e.g., 401 or 402) will be returned to the user. The size of the search results set (401), (402) will be proportional to the duration of time specified by the user. Within a given result set (401), (402), the user can view search instances (403) from other users and utilize such instances (403) to submit new and more focused keyword, phrase and/or subject searches via the document manager (101).

Figure 5:
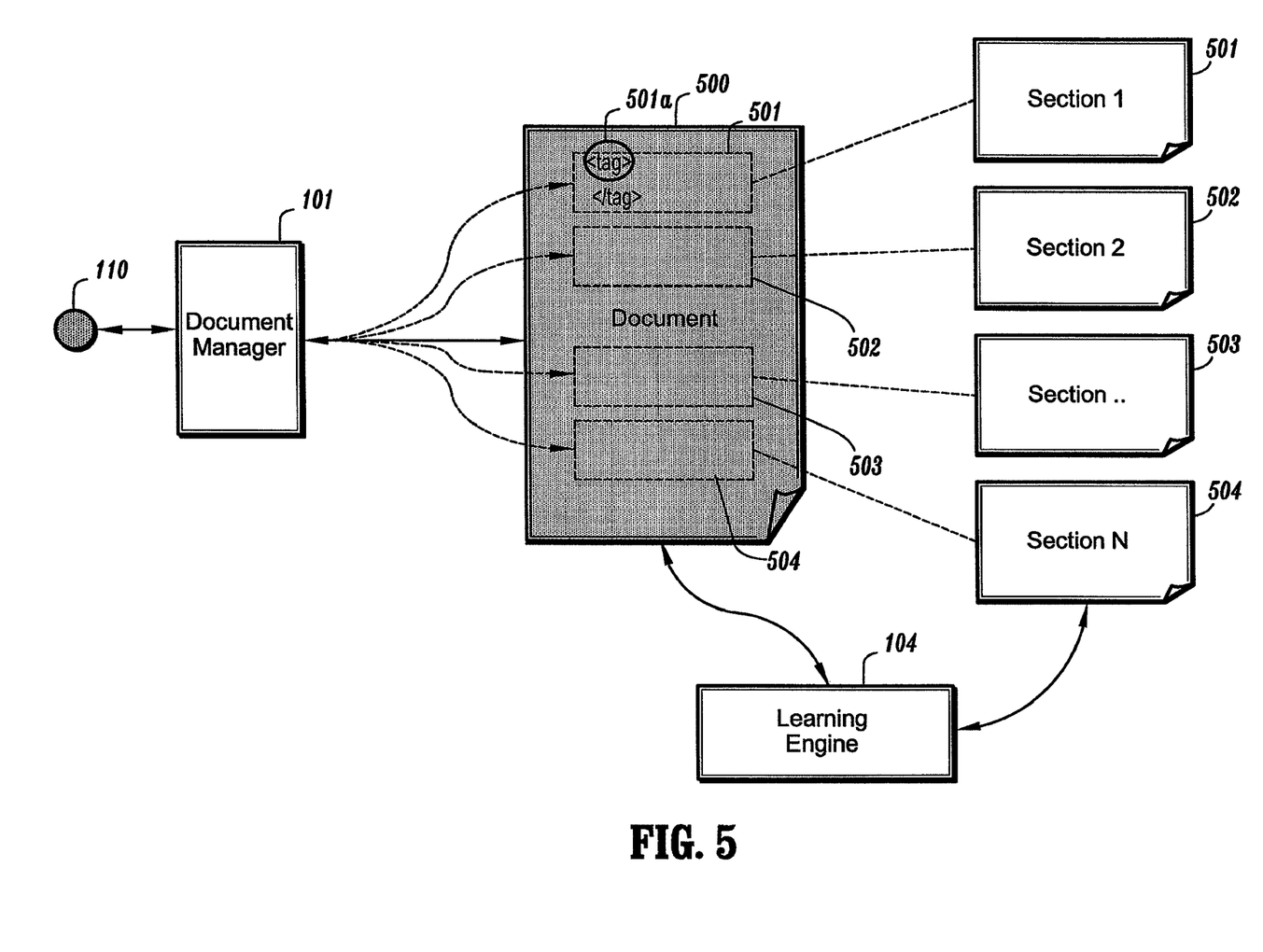
FIG. 5 illustrates a method for tagging one or more separate sections of an electronic file to enable the separate sections to be independently searched and categorized, according to an exemplary embodiment of the invention.

In another exemplary embodiment of the invention, electronic files (e.g., electronic documents) can be divided into sections that are delimited by specific tags. In this regard, each section can be treated as a separate document, which can be tagged and categorized as a means to facilitate focused searches for desired information. For example, FIG. 5 illustrates a method for tagging one or more separate sections of an electronic file to enable the separate sections to be independently searched and categorized, according to an exemplary embodiment of the invention. As depicted in FIG. 5, an electronic document (500) is shown comprising a plurality of sections (501, 502, 503 and 504). Each section is delimited by a specific tag (e.g., the document section (501) is depicted as being delimited by tag (501a)). A user (110) can restrict his/her search to document sections by specifying the corresponding section tag when sending a request to the document manager (101). In the exemplary embodiment, each section (501~504) is viewed as a separate document, and can inherit the properties, such as keywords and classification data from the parent document (500). Each section can be separately processed by the learning engine (104) as if each section was a separate file, for purposes of extracting knowledge used to update/generate categorization rules.

In another exemplary embodiment, as noted above, the collaborative system (100) provides publish/subscribe functionality, wherein the publish/subscribe module (106) identifies diverse topics of interest by registering triggers with one or more of the external data sources (120). Whenever new electronic information is published in a given channel, the publish/subscribe module (106) can automatically provide end users who are registered to the given channel with notification of the newly published electronic information. By way of example FIG. 6 illustrates methods that can be implemented by the publish/subscribe module (106) for automatically subscribing to external data sources to track currently published electronic information corresponding to subject areas of user interest and automatically notify end-users of such current information, according to exemplary embodiments of the invention.

Figure 6:
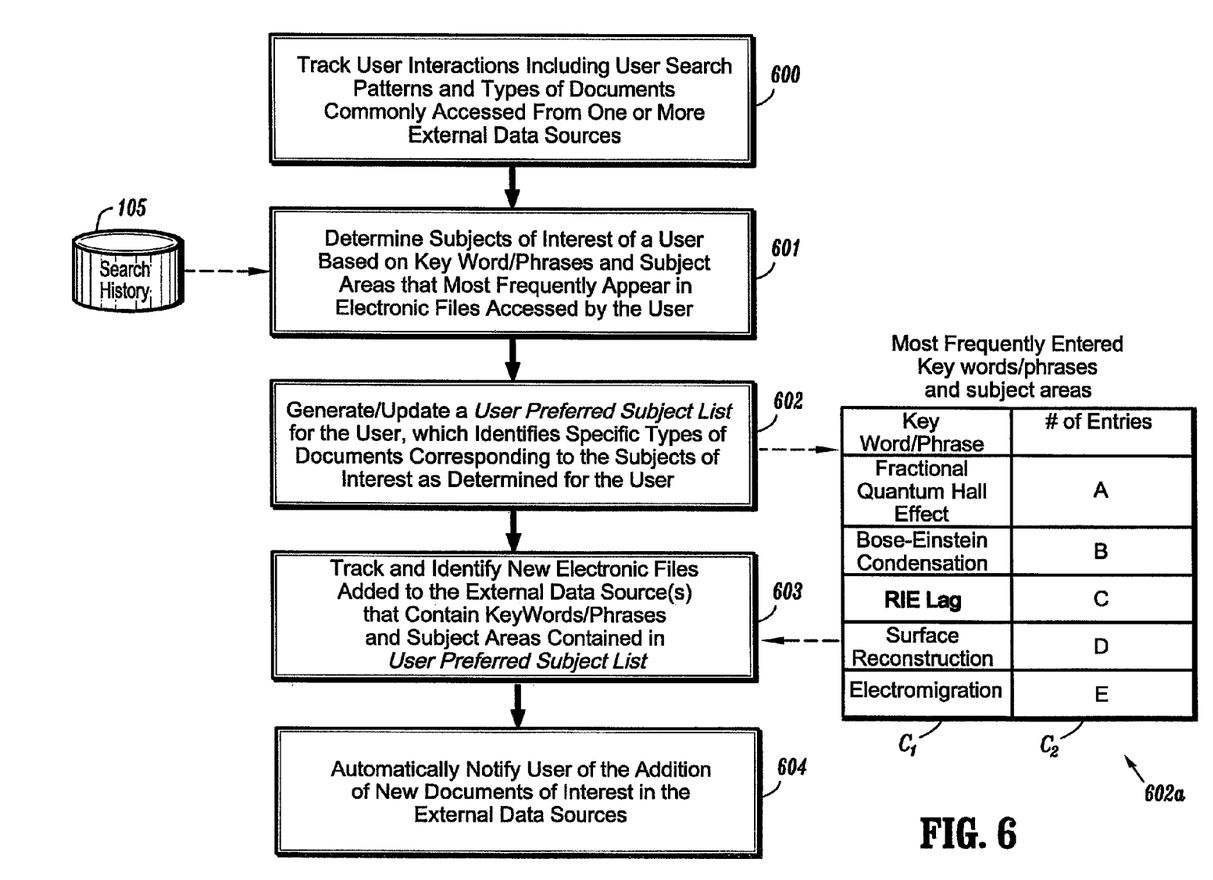
FIG. 6 illustrates methods for automatically subscribing to external data sources to track currently published electronic information corresponding to subject areas of user interest and automatically notify end-users of such current information, according to exemplary embodiments of the invention.

Referring to FIG. 6, the document manager (101) will monitor and record user interactions with the system (100) including histories of user search patterns and the types of documents commonly accessed from the one or more external data sources (120) (step 600). As noted above, the recorded search histories are processed to generate search history data that is stored in the search history database (105). The document manager (101) will periodically utilize search history data in the search history database (105) to determine one or more subjects of user interest for a given end-user based on keyword/phrases and subject areas that most frequently appear in electronic files accessed by the user (step 601).

The document manager (101) will then generate/update a user preferred subject list (602a) for the user, which identifies specific types of documents that correspond to the subjects of interest as determined for the given user (step 602). For instance, FIG. 6 depicts an exemplary user preferred subject list (602a) which comprises a table in which a plurality of subjects are listed in one column (C1) and corresponding number of entries (in a given row) are listed in a second column (C2). The user preferred subject list (602a) is one exemplary embodiment of the user interest index (107) depicted in FIG. 1.

Since the user-accessed electronic files originate from one or more of the external data sources (120), the system (100) can track and identify new electronic files that are published to the external data sources (120), which contain the keywords/phrases and subject areas that are highly ranked in the user preferred subject list (step 603). When electronic files of interest are published in a given channel, the user will automatically be notified of the new electronic file(s) (step 604). This allows the user to be kept apprised of the most current information regarding the specific preferred subject areas. In one embodiment, the user is provided notification of the newly published electronic file, leaving the user the option to access and store the electronic file in the shared information repository (102). In another exemplary embodiment, the system will automatically access and classify the new electronic file, and then store the electronic file in the shared repository, either with or without user confirmation regarding classification and storage, etc.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A computer readable medium embodying instructions executable by a processor to perform a method for managing electronic information, the method comprising:
   storing electronic files embodying the electronic information in a shared information repository that is shared by a community of client access devices, wherein the electronic files are categorized according to an ontology, wherein the ontology comprises an ontological model that is incrementally built and adapted over time based on multi-user interactions with the electronic information of the system; and
   incrementally adapting the ontology over time based on categorization rules that are automatically learned from knowledge obtained as a result of the multi-user interactions, wherein the multi-user interactions include one of accepting an automatic categorization of the electronic information and specifying a category of the electronic information.

2. The computer readable medium of claim 1, the method further comprising:
   maintaining a repository of categorization rules that are used for automatically categorizing an electronic file to be stored in the shared information repository;
   applying machine learning methods to generate new categorization rules or update existing categorization rules in the repository of categorization rules.

3. The computer readable medium of claim 1, the method further comprising;
   receiving a request via a network from a client access device to store an uncategorized electronic file in the shared information repository; and
   prompting the client access device with an option of storing the electronic file according to one or more ontological categories or according to one or more user-specified ontological categories.

4. The computer readable medium of claim 3, the method further comprising automatically monitoring user interactions with an external information sources.

5. The computer readable medium of claim 4, the method further comprising automatically prompting the client access device with an option of storing and categorizing an electronic file that is accessed from the external information source.

6. The computer readable medium of claim 4, the method further comprising storing search patterns in a repository of search histories.

7. The computer readable medium of claim 6, the method further comprising:
   determining preferred subjects of interest information for one or more the client access devices based on information stored in the repository of search histories; and
   using the preferred subjects of interest information to identify newly published electronic files in one or more external information sources.

8. The computer readable medium of claim 7, the method further comprising automatically notifying the client access device of a newly published electronic file that correspond to the preferred subjects of interest.

9. The computer readable medium of claim 7, the method further comprising automatically storing the newly published electronic file in the shared information repository.

10. The computer readable medium of claim 1, wherein storing electronic files in a shared information repository further comprises allowing a client access device to associate unique metadata to one or more electronic files stored in the shared information repository.

11. The computer readable medium of claim 1, wherein storing electronic files in a shared information repository further comprises independently categorizing one or more sections of an electronic file for storage in the shared information repository.

12. The computer readable medium of claim 1, further comprising a middleware module connected to the shared information repository via a network for automatically subscribing to at least one external data sources to track currently published electronic information.

13. The computer readable medium of claim 10, wherein the metadata comprises a user's unique preferred interest (UPI), wherein the UPI is not shared with other users and facilitates user searches based on the user's unique interests.

14. A computer readable medium embodying instructions executable by a processor to perform a method for managing electronic information, the method comprising:
   storing electronic files embodying the electronic information in a shared information repository that is shared by a community of client access devices, wherein the electronic files are categorized according to an ontology, wherein the ontology comprises an ontological model that is incrementally built and adapted to newly learned terminology over time based on multi-user interactions with the electronic information of the system; and
   incrementally adapting the ontology over time based on categorization rules that are automatically learned from historical logs of the multi-user interactions, wherein the multi-user interactions include one of accepting an automatic categorization of the electronic information, derived from monitoring at least one of user search patterns and user categorization patterns, and specifying a category of the electronic information.

15. The computer readable medium of claim 14, the method further comprising:
   maintaining a repository of categorization rules that are used for automatically categorizing an electronic file to be stored in the shared information repository; and
   applying machine learning methods to generate new categorization rules or update existing categorization rules in the repository of categorization rules.

16. The computer readable medium of claim 14, the method further comprising:
   receiving a request via a network from a client access device to store an uncategorized electronic file in the shared information repository; and
   prompting the client access device with an option of storing the electronic file according to one or more ontological categories or according to one or more user-specified ontological categories.

17. The computer readable medium of claim 16, the method further comprising automatically monitoring user interactions with an external information sources.

18. The computer readable medium of claim 17, the method further comprising automatically prompting the client access device with an option of storing and categorizing an electronic file that is accessed from the external information source.

19. The computer readable medium of claim 17, the method further comprising storing search patterns in a repository of search histories.

20. The computer readable medium of claim 19, the method further comprising:
   determining preferred subjects of interest information for one or more the client access devices based on information stored in the repository of search histories; and
   using the preferred subjects of interest information to identify newly published electronic files in one or more external information sources.

21. The computer readable medium of claim 20, the method further comprising automatically notifying the client access device of a newly published electronic file that correspond to the preferred subjects of interest.

22. The computer readable medium of claim 20, the method further comprising automatically storing the newly published electronic file in the shared information repository.

23. The computer readable medium of claim 14, wherein storing electronic files in a shared information repository further comprises allowing a client access device to associate unique metadata to one or more electronic files stored in the shared information repository.

* * * * *